(12) United States Patent
Yum et al.

(10) Patent No.: US 11,011,790 B2
(45) Date of Patent: May 18, 2021

(54) TRACTION BATTERY PACK PLATE WITH RETENTION FLANGE

(71) Applicant: Ford Global Technologies, LLC, Dearborn, MI (US)

(72) Inventors: Juil Yum, Ann Arbor, MI (US); Kimberley King, Northville, MI (US); Rajaram Subramanian, Ann Arbor, MI (US); Saravanan Paramasivam, South Lyon, MI (US); David J. Pfeiffer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 732 days.

(21) Appl. No.: 15/461,896

(22) Filed: Mar. 17, 2017

(65) Prior Publication Data

US 2018/0269441 A1    Sep. 20, 2018

(51) Int. Cl.
  *H01M 2/10*      (2006.01)
  *H01M 10/6554*   (2014.01)
  *H01M 50/20*     (2021.01)

(52) U.S. Cl.
  CPC ....... *H01M 50/20* (2021.01); *H01M 10/6554* (2015.04); *H01M 2220/20* (2013.01)

(58) Field of Classification Search
  CPC ............. H01M 2/1077; H01M 2/1083; H01M 10/6554; H01M 2220/20; H01M 2/043; H01M 2/0434; H01M 2/1005
  See application file for complete search history.

(56) References Cited

U.S. PATENT DOCUMENTS

| | | | |
|---|---|---|---|
| 2004/0151979 A1* | 8/2004 | Donaldson | H01M 2/1005 429/99 |
| 2008/0318119 A1* | 12/2008 | Watanabe | H01M 2/1016 429/99 |
| 2010/0306995 A1* | 12/2010 | Scheuerman | H01M 2/1077 29/623.1 |
| 2012/0177969 A1* | 7/2012 | Jin | H01M 2/1077 429/120 |
| 2012/0315508 A1* | 12/2012 | Kurita | H01M 2/1077 429/7 |
| 2013/0004822 A1* | 1/2013 | Hashimoto | H01M 2/1072 429/120 |

(Continued)

FOREIGN PATENT DOCUMENTS

| | | |
|---|---|---|
| JP | 2015056355 | 3/2015 |
| WO | 2015170852 | 11/2015 |

*Primary Examiner* — Ula C Ruddock
*Assistant Examiner* — Matthew W Van Oudenaren
(74) *Attorney, Agent, or Firm* — David Kelley, Esq.; Carlson, Gaskey & Olds, P.C.

(57) ABSTRACT

An exemplary battery assembly includes, among other things, battery cells distributed along an axis and disposed on a base. A bracket extends axially along a side of the battery cells. A plate extends from a first side to an opposing, second side of the battery cells. A retention flange of the plate is held between the bracket and the base. An exemplary method of retaining includes holding battery cells relative to a base using a bracket extending along a side of the array, and positioning a retention flange of a plate between the bracket and the base. A primary portion of the plate is disposed along an axial end of the array.

15 Claims, 3 Drawing Sheets

(56) References Cited

U.S. PATENT DOCUMENTS

| | | | | |
|---|---|---|---|---|
| 2013/0052516 A1* | 2/2013 | Kim | ................... | H01M 2/1016 |
| | | | | 429/159 |
| 2015/0004469 A1* | 1/2015 | Park | ................... | H01M 2/1077 |
| | | | | 429/151 |
| 2017/0141367 A1* | 5/2017 | Kim | ................... | H01M 2/1061 |

* cited by examiner

TRACTION BATTERY PACK PLATE WITH RETENTION FLANGE

TECHNICAL FIELD

This disclosure relates generally to a plate of a traction battery pack and, more particularly, to a retention flange of the plate that interfaces with other structures of the traction battery pack.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A traction battery pack of an electrified vehicle can include a plurality of battery cell assemblies arranged in one or more battery arrays. Plates, such as end plates and side plates, can hold the battery arrays.

SUMMARY

A battery assembly according to an exemplary aspect of the present disclosure includes, among other things, a plurality of battery cells distributed along an axis and disposed on a base. A bracket extends axially along a side of the battery cells. A plate extends from the first side to an opposing, second side of the battery cells. A retention flange of the plate is held between the bracket and the base.

In a further non-limiting embodiment of the foregoing assembly, the assembly includes a mechanical fastener that secures the bracket to the base. The mechanical fastener extends through an aperture in the retention flange when securing the bracket to the base.

In a further non-limiting embodiment of any of the foregoing assemblies, the assembly includes a tray of a battery pack enclosure. The mechanical fastener extends through the tray, the base, the retention flange, and the bracket when securing the bracket to the base.

In a further non-limiting embodiment of any of the foregoing assemblies, the assembly includes an extension of the bracket. The extension interfaces with the base when the bracket is secured relative to the base to locate a portion of the bracket relative to the base.

In a further non-limiting embodiment of any of the foregoing assemblies, the extension extends through an aperture in the retention flange to contact the base.

In a further non-limiting embodiment of any of the foregoing assemblies, the base is a thermal exchange plate.

In a further non-limiting embodiment of any of the foregoing assemblies, the bracket and the thermal exchange plate are grounded to each other through the extension.

In a further non-limiting embodiment of any of the foregoing assemblies, the plate is a first plate at a first axial end of the battery cells, and the assembly further includes a second plate at an opposite axial end of the battery cells. The bracket extends from the first plate to the second plate and holds the battery cells relative to the base.

In a further non-limiting embodiment of any of the foregoing assemblies, the assembly includes at least one tensioning rod that extends from the first to the second plate to clamp the battery cells axially between the first and second plates.

In a further non-limiting embodiment of any of the foregoing assemblies, the tensioning rod extends through laterally extending feet of frames that hold the battery cells within the array. The bracket engages the laterally extending feet to hold the battery cells relative to the base.

A method of retaining according to another exemplary aspect of the present disclosure includes, among other things, holding a plurality of battery cells relative to a base using a bracket extending along a side of the battery cells, and positioning a retention flange of a plate between the bracket and the base. A primary portion of the plate is disposed along an axial end of the battery cells.

A further non-limiting embodiment of the foregoing method includes securing the bracket relative to the base using a mechanical fastener that extends through an aperture in the retention flange.

In a further non-limiting embodiment of any of the foregoing methods, the mechanical fastener further extends through a tray of a battery pack enclosure.

In a further non-limiting embodiment of any of the foregoing methods, the battery cells are held within frames having laterally extending feet, and the securing clamps the laterally extending feet between a portion of the bracket and the base.

A further non-limiting embodiment of any of the foregoing methods includes using an extension of the bracket to interface with the base and locate a portion of the bracket relative to the base.

In a further non-limiting embodiment of any of the foregoing methods, the extension extends through an aperture in the retention flange to contact the base.

A further non-limiting embodiment of any of the foregoing methods includes grounding the bracket and the base to each other through the extension.

In a further non-limiting embodiment of any of the foregoing methods, the plate is a first plate and the method further includes axially compressing the battery cells between the first plate and a second plate at an opposing axial end of the battery cells.

In a further non-limiting embodiment of any of the foregoing methods, the flange is positioned within a recess of the bracket.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a plate of a traction battery pack. The plate includes a retention flange that, when assembled, is held between a bracket and a base of the traction battery pack. In some examples, the retention flange locates and secures the plate relative to other components of the traction battery pack.

Figure 1:
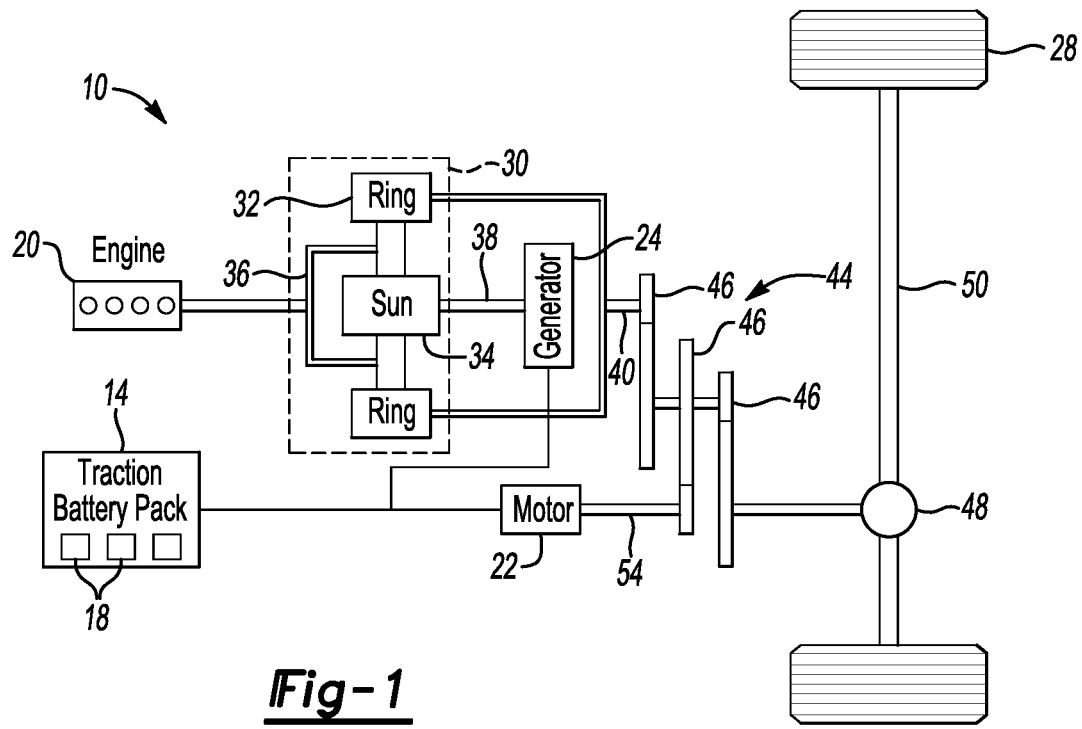
FIG. 1 illustrates a schematic view of an example powertrain of an electrified vehicle.

Referring to FIG. 1, a powertrain 10 of a plug-in hybrid electric vehicle (PHEV) includes a traction battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

Although depicted as a PHEV, it should be understood that the concepts described herein are not limited to PHEVs and could extend to traction battery packs in any other type of electrified vehicle, including, but not limited to, other hybrid electric vehicles (HEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery pack 14.

Figure 2:
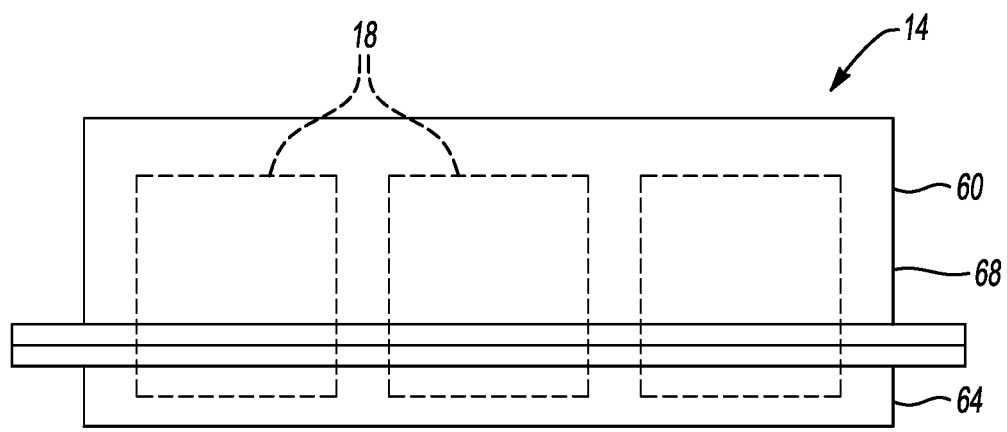
FIG. 2 illustrates a side view of a traction battery pack from the powertrain of FIG. 1.
Figure 3:
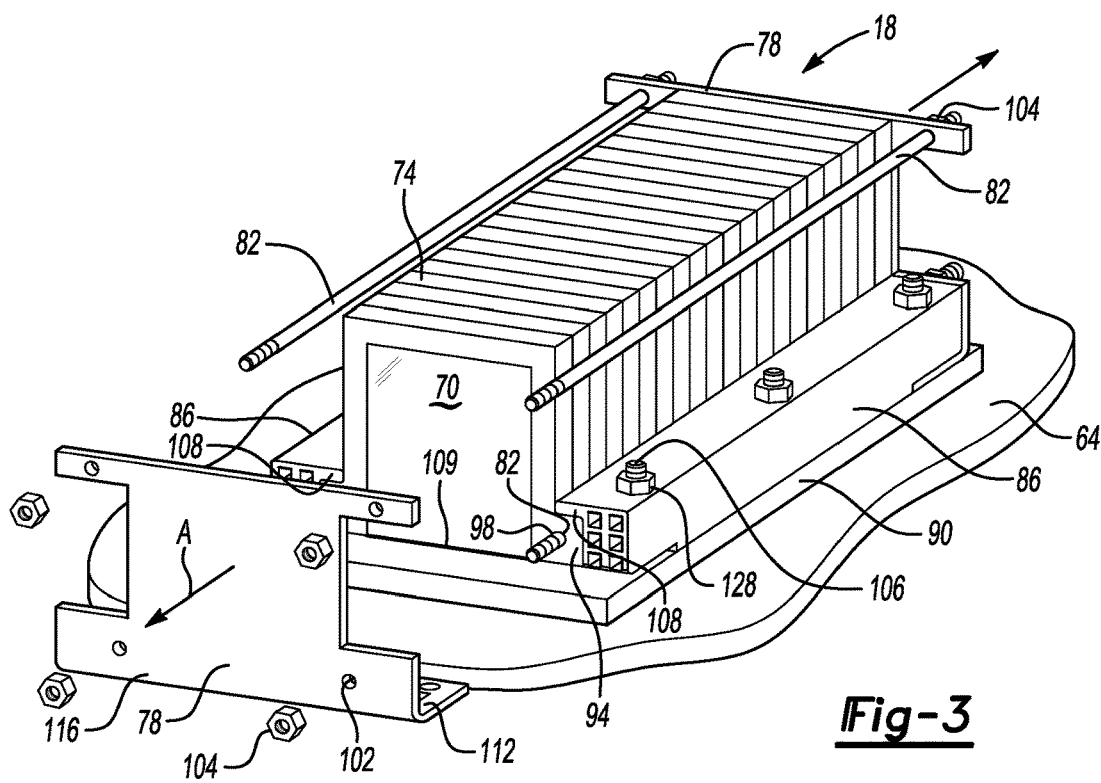
FIG. 3 illustrates a perspective, partially expanded view of a battery array secured within a portion of the traction battery pack of FIG. 2.

Referring now to FIGS. 2 and 3 with continuing reference to FIG. 1, the traction battery pack 14, in an exemplary non-limiting embodiment, includes an enclosure 60 housing three of the battery arrays 18. In other examples, the enclosure 60 could house fewer than three battery arrays 18, or more than three battery arrays 18.

The enclosure 60 includes a tray 64 fastened to a lid 68. Within the enclosure 60, the battery arrays 18 rest on the tray 64.

The battery arrays 18 include a plurality of battery cells 70, a plurality of frames 74, plates 78, tensioning rods 82, brackets 86, and a base 90.

The battery cells 70 are held within the frames 74 and distributed along an axis A. Opposing lateral sides of the frames 74 each include laterally extending feet 94. Apertures 98 within the laterally extending feet 94 receive the tensioning rods 82.

The plates 78 are positioned along opposing axial ends of the battery array 18. The plates 78 can thus be considered axial end plates.

The plates 78 include apertures 102 that receive axial end portions of the tensioning rods 82. In this example, each of the plates 78 receives an axial end portion of four different tensioning rods 82 disposed circumferentially about the axis A.

The axial end portions of the example tensioning rods 82 are threaded and protrude through the apertures 102. A threaded connector 104, such as a nut, can be torqued down onto the tensioning rods 82 to pull the plates 78 together along the axis A. Pulling the plates 78 together compresses the battery cells 70 along the axis A.

One bracket 86 is disposed on each lateral side of the battery array 18. The brackets 86 hold the battery cells 70 and the frames 74 relative to the base 90 and the tray 64. In this example, mechanical fasteners 106 extend through the brackets 86, the base 90, and the tray 64 to secure the brackets 86 relative to the base 90 and the tray 64 in an installed position.

When secured in the installed position, lips 108 of the brackets 86 extend laterally across the laterally extending feet 94 toward the axis A. The lips 108 restrict movement of the frames 74 away from the base 90.

The base 90, in an exemplary non-limiting embodiment, is a thermal exchange plate, such as a cold plate. In such an example, a fluid can be moved through the base 90 to exchange thermal energy with the battery cells 70, the frame 74, or both. In some specific examples, coolant is moved through the base 90 to cool the battery cells 70.

Securing the brackets 86 in the installed position biases the frame 74 and the battery cells 70 toward the base 90 to facilitate good thermal contact between the frames 74, the battery cells 70, and the base 90. In some examples, a thermal interface material (TIM) 109 could be positioned between the base 90 and the frame 74, and the base 90 and the battery cells 70. The TIM 109 can further facilitate transfer of thermal energy between the battery cells 70 and the base 90.

Figure 4:
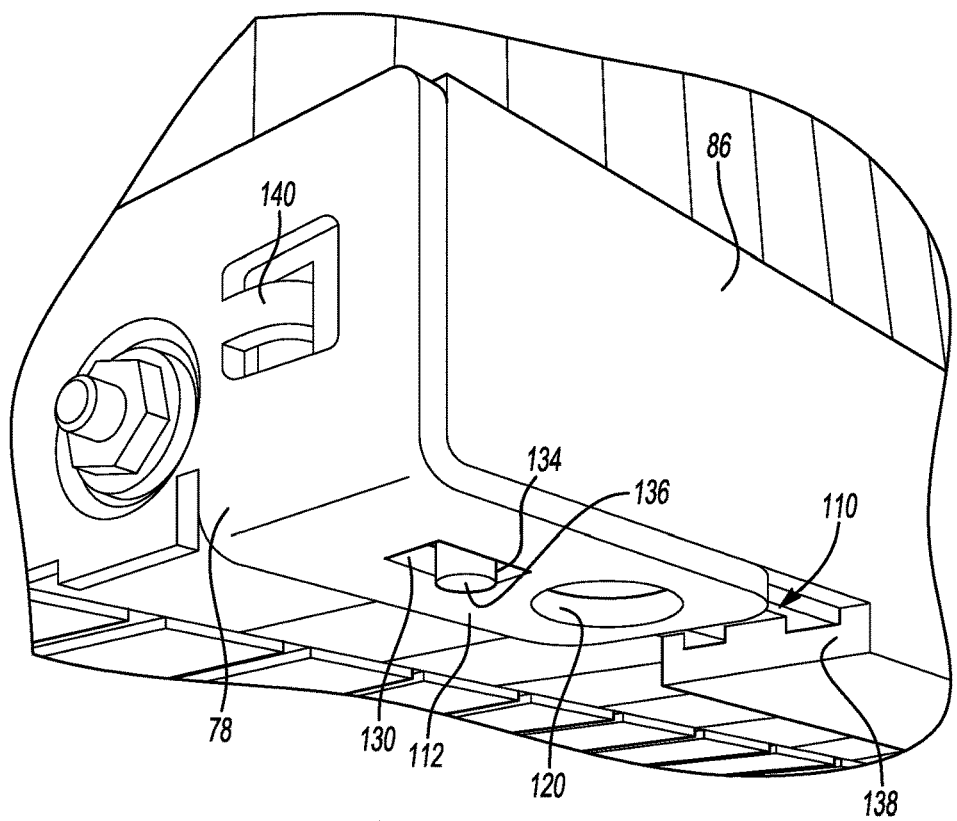
FIG. 4 illustrates a close-up view of a portion of the battery array of FIG. 3.
Figure 5:
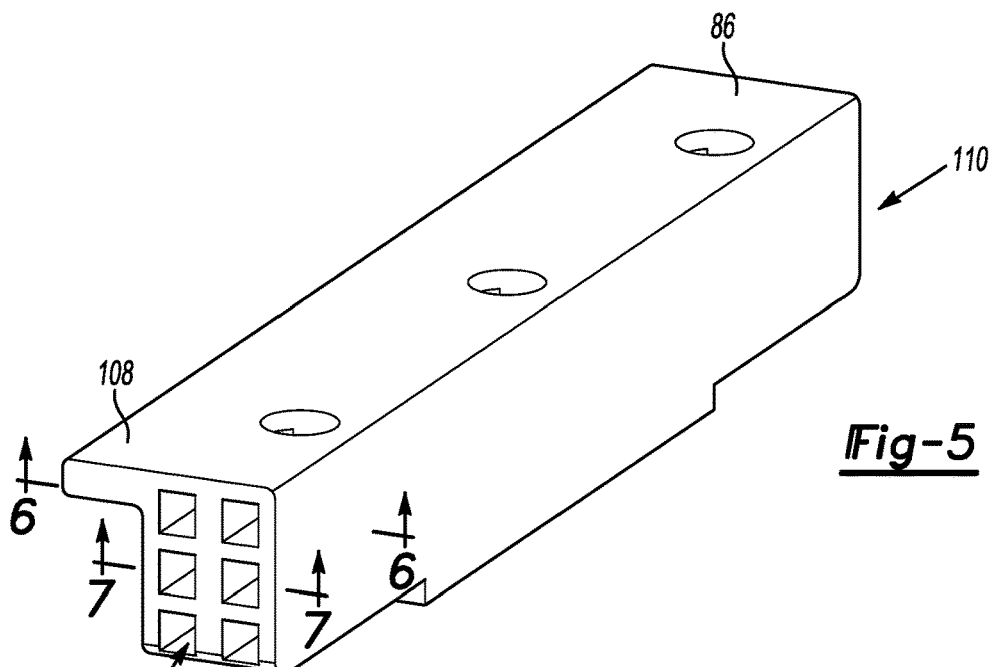
FIG. 5 illustrates a perspective view of a bracket from the battery array of FIG. 3.

Referring now to FIGS. 4 and 5 with continuing reference to FIG. 2, the brackets 86 each interface with a portion of the plates 78 in addition to the frames 74. In particular, the example bracket 86 of FIGS. 4 and 5 includes a recess 110 at each of its axial ends. The brackets 86 on the opposing side of the battery cells 70 is similarly configured.

The plates 78 each include retention flanges 112. The recesses 110 of the brackets 86 each receive one of the flanges 112 such that, when the brackets 86 are in the installed position, the flanges 112 received within the recesses 110 are captured between the base 90 and the axial ends of the brackets 86.

The flanges 112 extend axially from a primary portion 116 of the plates 78. The primary portion 116 is generally the portion of the plate 78 aligned with the battery cells 70 and the frames 74. The primary portion 116 compresses the battery cells 70 axially. Notably, the primary portion 116 and the flanges 112 are part of the same continuous, monolithic structure. The primary portion 116 and the flanges 112 could be formed from the same sheet of material via various forming and machining operations.

The plates 78 each include two flanges 112. For each plate 78, one of the flanges 112 is positioned on a first lateral side of the battery cells 70, and the other flange 112 is positioned on the opposing, second lateral side.

At one axial end of each of the brackets 86, the recess 110 receives the flange 112 of one of the plates 78. At another axial end of the respective bracket 86, the recess 110 receives the flange 112 of another of the plates 78.

Figure 6:
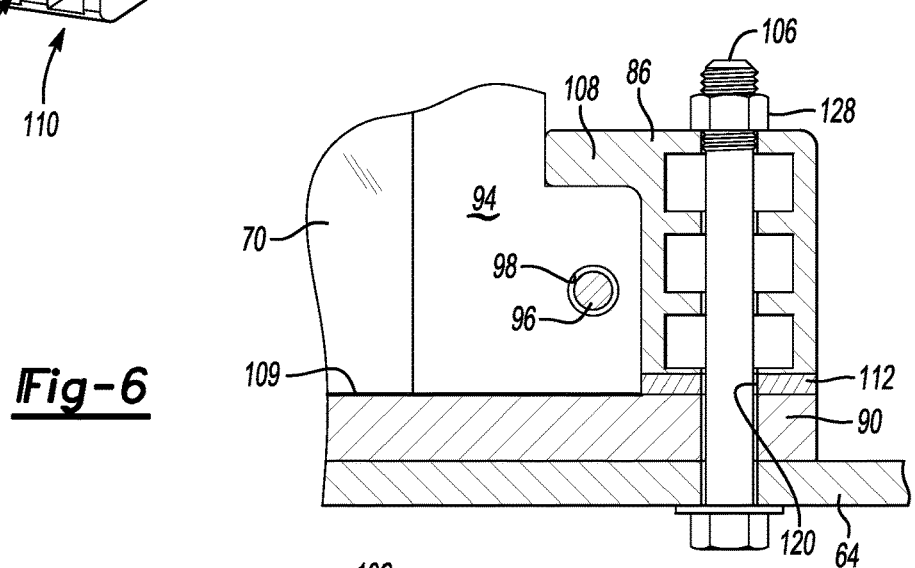
FIG. 6 illustrates a section view at line 6-6 in FIG. 5 when the bracket is in an installed position within the battery array.

Referring to FIG. 6 with reference to FIGS. 4 and 5, the flange 112 includes an aperture 120. The aperture 120 provides a passage for the shank of one of the mechanical fasteners 106 to extend from an area beneath the base 90 and the tray 64 through the bracket 86 to interface with a bolt 128.

The bracket 86 and the flange 112 are located relative to each other when the bolt 128 extends through the bracket 86 and the flange 112. The bracket 86, for example, cannot move laterally away from the flange 112 due to contact between the bolt 128 and the bracket 86.

Figure 7:
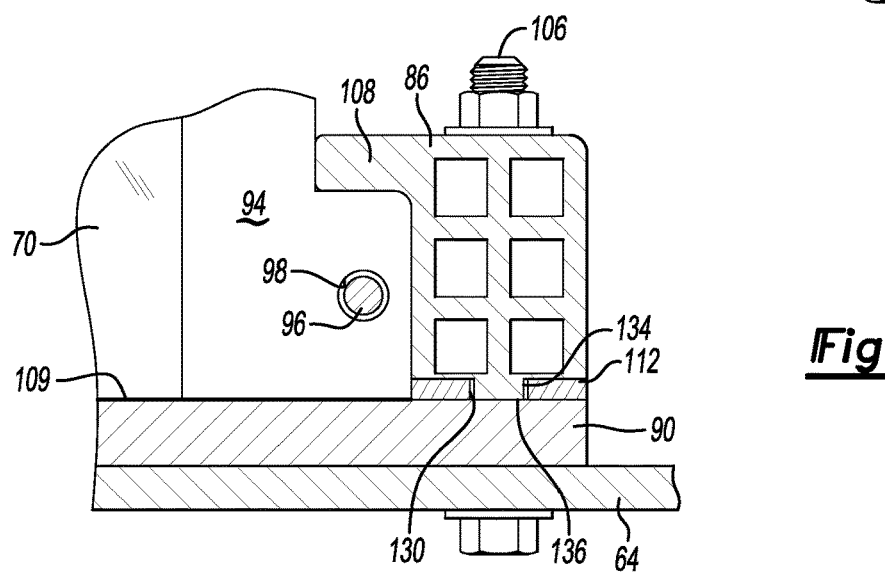
FIG. 7 illustrates a section view at line 7-7 in FIG. 5 when the bracket is in an installed position within the battery array.

Referring to FIG. 7 with reference to FIGS. 4 and 5, the flange 112 includes another aperture 130 that receives an extension 134 of the bracket 86. The aperture 130 has a rectangular profile in this example.

The extension 134 includes a leading face 136 that moves through the aperture to interface with the base 90 as the bracket 86 is clamped by the mechanical fasteners 106. The extension 134 locates the areas of the bracket 86 that are adjacent to the extension 134. The extension 134 prevents the recess 110 from collapsing as the mechanical fasteners 106 are torqued down to secure the bracket 86. The extension 134 also provides a ground path between the bracket 86 and the base 90 such that the base 90 and the bracket 86 are grounded to each other through the extension 134. The flange 112 also, in this exemplary embodiment, directly contacts the base 90 so that the plate 98 is grounded to the base 60.

The axial ends of the bracket 86 are thus located relative to the base 90 via the extension 134. Locating the bracket 86 to the base 90 in this way can eliminate the need for additional separate locating components. The interface between the base 90 and the leading face 136 can provide a datum that help to ensure that the frames 74 with the battery cells 70 are spaced appropriately from the base 90. The spacing can be configured to facilitate relatively uniform contact between the TIM 109 and, if used, cooling fins extending from between the battery cells 70 toward the TIM 109. In some examples, the extension 134 is configured to provide a 0.75 millimeter space between the base 90 and the battery cells 70, cooling fins, or both. The TIM 109 is held within this space. Where the flange 112 contacts the base 60 is used as a datum in this example.

Locating the bracket 86 to the base 90 can reduce potential variations in the position of the bracket 86 relative to the battery cells 70 and frames 74. Reducing the variation can simplify the assembly of the battery arrays 18.

The bracket 86 and the flange 112 are also located axially and laterally relative to each other through the receipt of the extension 134 within the aperture 130. The bracket 86, for example, cannot move laterally too far away from the flange 112 due to contact between the extension 134 and the sides of the bracket 86 defining the aperture 130.

Although the exemplary extension 134 is shown as extending from the bracket 86, the extension 134, in another example, could extend from the flange 112 and be received within an aperture of the bracket 86.

Additionally, the receipt of the flange 112 within the recess 110 directly links movement of the bracket 86 to movement of the plate 78, and vice versa. Linking the movement of the bracket 86 to the plate 78 can occur due to the extending of the mechanical fastener 106 through the flange 112 and the bracket 86. Linking the movement of the bracket 86 to the plate 78 can additionally occur due to the extension 134 of the bracket 86 extending through the aperture 130. Linking together movement of the bracket 86 and the plate 78 can enhance performance of the battery array 18 if, for example, an impact load is applied to the battery array 18.

In some examples, linking movement of the plate 78 and the bracket 86 can help the battery array 18 withstand an impact load while keeping the component of the battery array 18 generally coupled together. In particular, when an axially directly load is applied to one of the plates 78, the bracket 86 is moved axially along with that plate 78 due to the fastener 106 securing together the bracket 86 and the flange 112, due to the extension 134 of the bracket 86 being received with the aperture 130 of the flange 112, and additionally due to an axial end of the flange 112 contacting an axially facing surface 138 (FIG. 4) of the bracket 86.

Referring again to FIGS. 4 and 5, the bracket 86 can be an extruded metal or metal alloy. The bracket 86 is extruded aluminum in one example. The bracket 86 can be extruded with channels 144, which can reduce material requirements. After extruding a section of the bracket 86 corresponding to a desired axial length of the bracket 86, the recess 110 can be machined into the bracket 86, as well as the extension 134.

In this example, the plates 78 additionally include a tab 140 configured to be at least partially received within one of the channels 144 of the bracket 86. The receipt of the tab 140 within the channel 144 helps to align the bracket 86 to the plate 78 and other components during assembly. The tab 140 can, for example, make the alignment of the bracket 86 and the plate 78 more repeatable to ease assembly. The tab 140 is essentially used as a rough locator until the bracket 86 is more securely fastened with the fasteners 106.

The example tab 140 is formed within the plate 78 using a piercing operation, such as lancing. In another example, a tab could instead extend from the bracket 86 and be received within a corresponding recess within the plate 78 to help align components during assembly.

Features of the disclosed examples includes an array incorporating features that lock, locate, and retain. The features, among other things, effectively interlock a plate with a bracket. The features can help the array withstand an impact event.

The features could include locating feature permitting tighter tolerances and reduced assembly time. For example, the bracket could have datum features, which permits more dimensional control. The bracket and the frame both having datum features is particularly beneficial for controlling clearances to the TIM. Since the features are integrated into existing components, no additional components are required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
a plurality of battery cells distributed along an axis and disposed on a base;
a bracket extending axially along a first side of the plurality of battery cells;
a plate extending from the first side to an opposing, second side of the plurality of battery cells; and
a retention flange of the plate held between the bracket and the base, wherein the retention flange is received within a recess of the bracket and captured directly between the bracket and the base.

2. The battery assembly of claim 1, further comprising a mechanical fastener to secure the bracket to the base, the mechanical fastener extending through an aperture in the retention flange when securing the bracket to the base.

3. The battery assembly of claim 2, further comprising a tray of a battery pack enclosure, the mechanical fastener extending through the tray, the base, the retention flange, and the bracket when securing the bracket to the base.

4. The battery assembly of claim 1, further comprising an extension of the bracket, the extension interfacing with the base when the bracket is secured relative to the base to locate a portion of the bracket relative to the base.

5. The battery assembly of claim 4, wherein the extension extends through an aperture in the retention flange to contact the base.

6. The battery assembly of claim 5, wherein the base is a thermal exchange plate.

7. The battery assembly of claim 6, wherein the bracket and the thermal exchange plate are grounded to each other through the extension.

8. The battery assembly of claim 1, wherein the plate is a first plate at a first axial end of the battery cells and further comprising a second plate at an opposite, second axial end of the battery cells, the bracket extending from the first plate to the second plate and holding the battery cells relative to the base.

9. The battery assembly of claim 8, further comprising at least one tensioning rod that extends from the first to the second plate to clamp the battery cells axially between the first and second plates.

10. The battery assembly of claim 9, wherein the at least one tensioning rod extends through respective laterally extending feet of frames that hold the battery cells, and the bracket engages the laterally extending feet to hold the battery cells relative to the base.

11. The battery assembly of claim 1, wherein the retention flange extends axially toward the battery cells, wherein the retention flange and a primary portion of the plate are parts of the same continuous, monolithic structure, the retention flange laterally outside the battery cells, the primary portion of the plate aligned with the battery cells and configured to compress the battery cells axially.

12. The battery assembly of claim 1, wherein the retention flange axially overlaps with at least one of the plurality of battery cells.

13. The battery assembly of claim 1, further comprising a tab of the plate that is received within a channel of the bracket.

14. The battery assembly of claim 10, further comprising a tray of a battery pack enclosure and a mechanical fastener to secure the bracket to the base, the mechanical fastener extending through an aperture in the retention flange when securing the bracket to the base, the mechanical fastener extending through the tray, the base, the retention flange, and the bracket when securing the bracket to the base.

15. The battery assembly of claim 1, wherein a portion of the bracket extends along a first side of the retention flange, and a portion of the base extends along an opposite, second side of the retention flange.

* * * * *